United States Patent
Huddleston

(10) Patent No.: US 6,212,818 B1
(45) Date of Patent: Apr. 10, 2001

(54) SOFT BAIT FISH LURE

(76) Inventor: Samuel M. Huddleston, P.O. Box 2305, Camarillo, CA (US) 93011-2302

( * ) Notice: Subject to any disclaimer, the term of this patent is extended or adjusted under 35 U.S.C. 154(b) by 0 days.

(21) Appl. No.: 09/412,525

(22) Filed: Oct. 5, 1999

Related U.S. Application Data

(60) Provisional application No. 60/102,993, filed on Oct. 5, 1998.

(51) Int. Cl.$^7$ .................................................. A01K 85/00
(52) U.S. Cl. ..................... 43/42.37; 43/42.31; 43/42.39; 43/42.09; 43/42.15; 43/42.26
(58) Field of Search .................... 43/42.02, 42.09, 43/42.15, 42.26, 42.27, 42.37, 42.3, 42.31, 42.39

(56) References Cited

U.S. PATENT DOCUMENTS

| | | | |
|---|---|---|---|
| 2,218,280 | * 10/1940 | Deering | 43/42.27 |
| 2,597,792 | * 5/1952 | Hardy | 43/42.15 |
| 3,105,317 | * 10/1963 | Fox | 43/42.26 |
| 3,868,784 | * 3/1975 | Sabol | 43/42.23 |
| 4,516,352 | * 5/1985 | Firmin | 43/42.26 |
| 4,918,854 | * 4/1990 | Webre, Jr. | 43/42.31 |
| 5,381,620 | * 1/1995 | Gibbs | 43/42.09 |
| 5,787,634 | * 8/1998 | Way | 43/42.15 |
| 5,815,978 | * 10/1998 | Huddleston | 43/42.09 |

* cited by examiner

Primary Examiner—Kurt Rowan
(74) Attorney, Agent, or Firm—Roger A. Marrs

(57) ABSTRACT

A soft bait fish lure having an elongated body composed of two parts of which the head part is composed of a hard material while the rearmost part representing the tail of the lure is composed of a soft and flexible material. The two parts are joined together by an adhesive so as to provide an integral lure. The rearmost tail part includes cutouts on each side to reduce the thickness so that an integral hinge is formed permitting the tail fin to flex and move simulating swimming motion as the lure is drawn through the water. Flexible legs or claws are integrally formed with the hard part. The midsection of the lure includes an attachment for a fishing line and a hook with a weed guard is included. Guide means are included for aligning the head part with the tail part during attachment. Sound attraction is produced by a rattle device installed in the head part complementing the over-all lure ability. A weight is strategically placed in the head part to stabilize the lure.

1 Claim, 1 Drawing Sheet

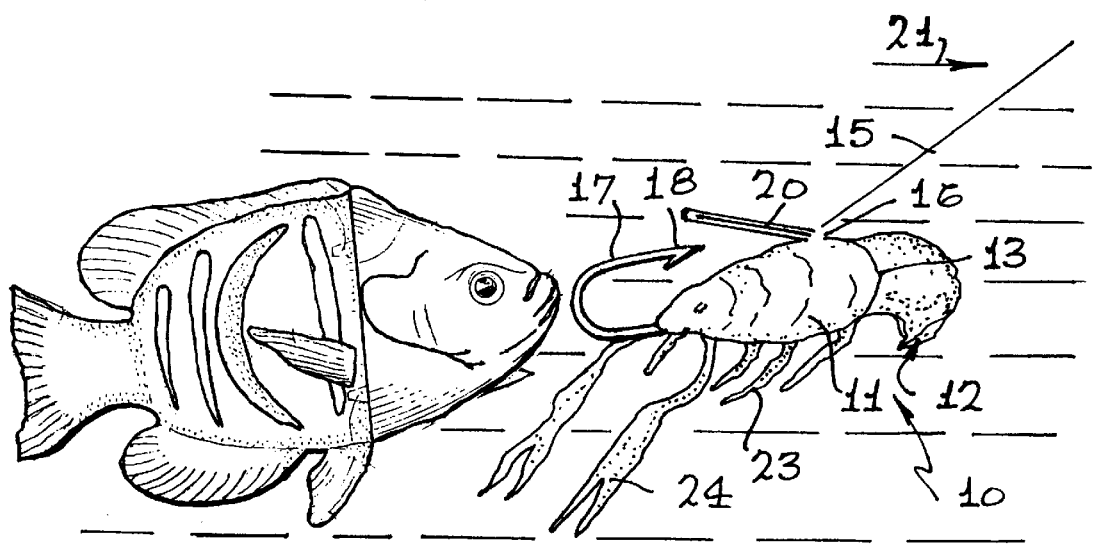
FIG. 1
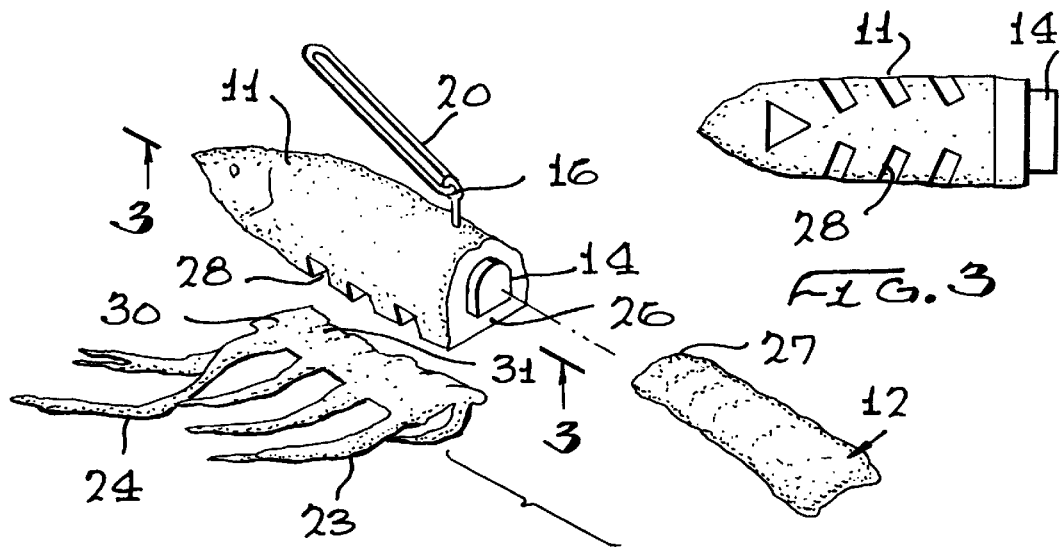
FIG. 3
FIG. 2
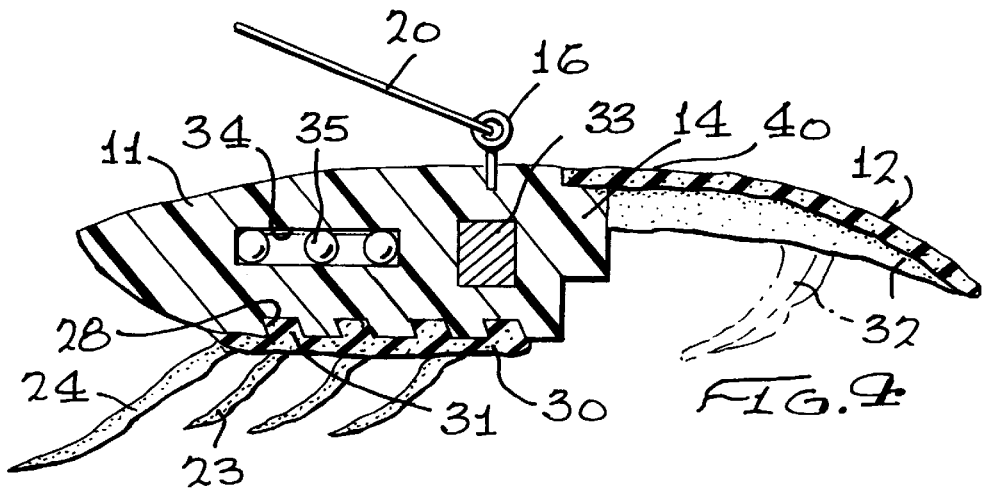
FIG. 4

SOFT BAIT FISH LURE

This application claims benefit of Provisional application Ser. No. 60/102,993 filed Oct. 5, 1998.

BACKGROUND OF THE INVENTION

1. Field of the Invention

The present invention relates to the field of fishing lures, and more particularly to a novel two-part soft bait or bodied lure having the rearmost part composed of soft, pliable and flexible material wherein a flexible part attached to a rigid part is provided with cutouts attached to a rigid part in the soft part permitting flexing representing a swimming fish as the lure is drawn through the water.

2. Brief Description of the Prior Art

In the past, it has been the conventional practice to use a variety of fishing lures to attract fish in an attempt to catch fish. One such lure is disclosed in U.S. Design Pat. No. 369,200 and is called a hard bait lure since the two parts of the lure are composed of hard and rigid materials. The two parts are joined together by an eyelet and hook arrangement so that the rearmost part of the lure will pivot on the hook and eye arrangement to represent a swimming fish. The extreme end of the rearmost part terminates in a flexible fin but the fin does not pivot. Because the fin does not pivot and because the two parts are of a rigid construction and material, simulated swimming of a fish is not realistic. Also, such conventional hard bait lures may include flexible components representing fins but these flexible components do not pivot with respect to the body of the fish and do not simulate accurately the flexing movement of a fish.

Therefore, problems and difficulties have been encountered with hard bait fish lures that stem from the fact that the swimming of a fish is not accurately experienced during a fishing procedure and the lure does not appear to be realistic to fish intended to be caught. Furthermore, such hard bait lures require extensive labor intensive operations since the lures are generally composed of wood and require the fitting of the two rigid parts together by a hinge mechanism.

Prior attempts have been made to produce soft bait such as disclosed in U.S. Pat. No. 5,815,978 which has proven to be successful. However, the lure is silent without sound attracting capability and does not prevent weed catching or clogging about the hook. Additionally, placement of the weight or sinker is important since the placement of the line anchor and the relative fore and aft weight of the lure must be considered.

SUMMARY OF THE INVENTION

Accordingly, the above problems and difficulties are avoided by the present invention which provides a novel soft bait fish lure having an elongated body composed of two parts of which the head part is composed of a rigid and hard material while the rearmost part representing the tail of the lure is composed of a soft and flexible material. The two parts are joined together by an adhesive means so as to provide an integral lure. The rearmost body or tail part of soft material includes cutouts on each side to reduce the thickness so that an integral hinge is formed permitting the tail fin to flex and move simulating swimming motion as the lure is drawn through the water. Also, flexible legs or claws are integrally formed with the hard foremost body or head portion so that they are integral therewith and further represent a visual representation of an actual fish. The midsection of the lure includes means for attachment for a fishing line and a hook with a weed guard is included. Guide means are included for aligning the head part with the tail part during attachment and securement and the parts of the lure are readily storable in a box or container with adhesive in a tube or can so that attachment of the two parts can be made while the fisherman is at a fishing site.

Sound attraction is produced by a rattle device installed in the hard part complementing the over-all lure ability. A weight is strategically placed in the hard part to stabilize the lure.

Therefore, it is among the primary objects of the present invention to provide a novel soft bait fishing lure which looks and feels similar to an actual fish, such as a squid, shrimp or the like.

Another object of the present invention is to provide a soft bait fishing lure which will appear to swim while submerged while emitting a sound as an added attraction to gaining the attention of a fish intended to be captured.

Another object of the present invention is to provide a novel soft bait fish lure which has a hard and rigid head part and a soft and flexible rearmost body or tail part attached to the head part and wherein the most flexible part includes cutouts defining an integral hinge so that the tail of the lure will flex and is pliable enough to distort while being drawn through the water to represent a swimming fish, such as a squid, shrimp or other type of crawfish.

Yet a further object of the present invention is to provide a novel fishing lure which is composed of a rearmost body portion of soft and pliable material having an integral hinge while the head part of the lure is composed of a rigid material containing a weighted member and means for connecting line and hooks thereto with a weed guard.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a diagrammatic view illustrating the novel soft bait lure being drawn through water in order to entice or attract fish;

FIG. 2 is an exploded perspective view of the lure shown in FIG. 1;

FIG. 3 is a bottom view of the hard part of the lure shown in FIG. 2; and

FIG. 4 is a longitudinal cross-sectional view of a fully assembled soft bait lure employing the components shown in the exploded view of FIG. 2.

DESCRIPTION OF THE PREFERRED EMBODIMENT

Referring to FIG. 1, the novel soft bait fishing lure of the present invention is illustrated in the general direction of arrow 10 and is illustrated as comprising an elongated body having a head part 11 and a rearmost or tail part 12. The head part is composed of a hard and rigid material while the rearmost or tail part is composed of soft, flexible material. The forward or head part 11 may be composed of a plastic composition which hardens while the rearmost or tail section or part 12 may be composed of a soft and pliable plastic, such as hot melt "plastisol" material which is readily available on the market. It can be seen that the head part or section 11 is joined to the rearmost or tail part or section 12 along a line 13. The joint line represents mated surface areas of the two parts or sections which are joined together utilizing a plastic adhesive material or the like. In order to guide and align the parts together during the adhesive procedure, guide pins or studs, such as a stud 14 shown in FIG. 2, are employed which are indexed with the tail section or part 12.

FIG. 1 further illustrates that a line 15 is attached to a securement loop or ring 16 carried on the hard part of the lure. Also, the extreme terminating end of the hard head part 11 mounts a conventional hook 17 which has a barbed end facing the anchor loop 16. The barbed end is represented by numeral 18 and is in spaced-apart relationship with respect to the exterior surface of the rigid head part 11. The anchor ring 16 further supports the elongated loop 20 which is a weed guard and is intended to deploy or prevent submerged weeds or debris from gathering onto the barbed end 18 of the hook 17 while the line 15 draws the lure through the water in a submerged condition.

The lure 10 is intended to simulate a crawfish, such as squid, shrimp or the like and in order to simulate swimming, such a fish swims backwards in that during the swim, the rearmost or trail section 12 is first presented in the direction of pull while the rigid head 11 is the lastmost portion to be drawn through the water. This is why the opening to the hook 17 faces the head of the lure as the line 15 draws the lure in the direction of arrow 21. The head of the lure also serves to mount a plurality of appendages representing flexible legs 23 and claws 24.

When the lure 10 is pulled in the direction of arrow 21 by fishing line 15, the flexible tail section 12 will bend downwardly further simulating an actual squid, shrimp or the like. Simultaneously, the flexible legs 23 and claws 24 will wiggle and undulate since the lure 10 simulates the characteristics and swimming action of a typical squid or shrimp, a fish 25 is attracted and prone to take the bait. To be described later, a rattle device is placed inside the hard portion 11 so that a sound will be emitted to enhance attraction of the fish 25.

Referring now in detail to FIG. 2, an exploded view of lure 10 is illustrated wherein it can be seen that the rigid head 11 is a separate part from the flexible tail part or section 12. It can also be seen that the anchor loop 16 is carried on the hard head part 11 immediately adjacent to the end providing an attachment surface 26 to which end 27 of the flexible tail section 12 may be attached. The stud 14 is used as a mounting piece on which the terminating end 27 of tail 12 is placed and attached. Furthermore, it can be seen that the rigid and hard end part 11 further includes a plurality of slots, such as slot indicated by numeral 28. The slots are employed for mounting the flexible claws and legs which are attached to a central elongated body 30. The body is provided with projections or ridges, such as ridge 31 intended to be received within the slot 28. The corresponding ridges and/or projections will fit into corresponding and indexed slots placed within the body 11.

FIG. 3 more clearly illustrates the underside of the lure rigid head 11 illustrating that the plurality of slots, such as slot 28, terminate at the midsection of body 11 but are open-ended in order to receive the projections 31 from the respective bodies of the leg and claw portions.

Referring now in detail to FIG. 4, it can be seen that the tail portion or section 12 is flexible and when pulled in the direction of arrow 21 in FIG. 1, will assume the dotted line position, as illustrated. When at last out of the water, the flexible material will cause the tail to pull into the position shown in solid lines. It can also be seen that the tail is substantially concave at its undersurface which is represented by numeral 32.

It can also be seen that a weight 33 is placed at the end of the hard head part of the lure which is adjacent to the mounting member 14. The weight is preferably placed directly under the anchor loop 16 to which the line 15 is attached. The weight is completely surrounded by the hard material and is not exposed exteriorly of the lure. Furthermore, it can be seen that the ridges or ribs of the body portion 31 of the respective leg and claw device is placed within the slot, as previously described. For example, rib 31 is placed within slot 28. This arrangement is repeated along the underside of the front head portion 11.

Therefore, it can be seen that the novel lure 10 of the present invention provides a soft bait which is configured and offers characteristics of a swimming fish or the like. The tail portion 12 will bend when pulled in the direction of arrow 21 while the weight 33 maintains the lure submerged. In order to further attract fish, a capsule 34 is placed within the hard portion or section 11 into which a plurality of metal balls, such as ball 35, are placed so as to be permitted to roll back and forth as the lure is pulled through the water. The balls 35 will strike one another causing a sound that will attract fish. This device may be referred to as a rattle and is completely enclosed by the rigid material within the head 11.

A joining area 40 where the end of flexible tail 12 is attached to the stud 14 represents a flexible joint or hinge so that the tail will flex between the dotted line position and the solid line position. Likewise, the area where the legs and claws join with the body 30 serve as hinge or flexible joints.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A soft bait fish lure comprising:
   an elongated body having a rigid, hard head part and a soft, flexible tail part;
   said head part and said tail part having opposing attachment surfaces joined together to provide a coextensive integral body of unitary construction;

a weight disposed in said head part adjacent to said attachment surfaces;

said head part having an undersurface provided with a plurality parallel spaced-apart notches;

a member occupying said notches having a plurality of flexible appendages outwardly projecting;

said tail part extending rearwardly and having a bias tending to flex said tail part downwardly and inwardly towards said head part whereby said body travels in a direction with said tail part to bend towards said head part;

an internal cavity in said head part;

noise maker enclosed by said head part in said cavity;

a stud carried on said attachment surface of said head part;

said tail part attachment surface having a cavity accepting said stud;

said noise maker includes at least two metal balls in said cavity in spaced-apart relationship so as to create a rattling noise as said body moves through water;

a hook carried on said head part and an eyelet fixed to said head part for receiving a fishing line; and an anti-weed preventer movably carried on said eyelet and engageable with said hook.

* * * * *